United States Patent

[11] 3,621,385

| [72] | Inventor | Bunjiro Ichijo<br>Hamamatsu-shi, Japan |
|---|---|---|
| [21] | Appl. No. | 876,797 |
| [22] | Filed | Nov. 14, 1969 |
| [45] | Patented | Nov. 16, 1971 |
| [73] | Assignee | Kett Electric Laboratory<br>Tokyo, Japan |
| [32] | Priority | Nov. 18, 1968 |
| [33] |  | Japan |
| [31] |  | 43/84356 |

[54] METER FOR MEASURING CAPACITANCES OF EXTREMELY HIGH LOSS DIELECTRIC MATERIALS
1 Claim, 6 Drawing Figs.

[52] U.S. Cl. .................................................. 324/60 R
[51] Int. Cl. ...................................................... G01n 11/52
[50] Field of Search .......................................... 324/57, 60, 61

[56] References Cited
UNITED STATES PATENTS

| 2,906,950 | 9/1959 | Ichijo | 324/61 |
| 3,179,881 | 4/1965 | Ichijo | 324/60 |

Primary Examiner—Edward E. Kubasiewicz
Attorney—Hall, Pollock & Vande Sande

ABSTRACT: A capacitance meter for measuring capacitance of extremely high loss dielectric materials comprises a series resonant circuit which includes two parallel circuits. One of the parallel circuits comprises a fixed capacitor, a first portion of a variable gang capacitor, and a first test sample; and the other parallel circuit comprises an inductance, a second portion of the variable gang capacitor, and a second test sample identical to the first sample. An accurate measurement of the capacitance of the material in the samples, irrespective of values of resistance components thereof, is effected through a substitution method by adjusting the variable gang capacitor.

PATENTED NOV 16 1971
3,621,385
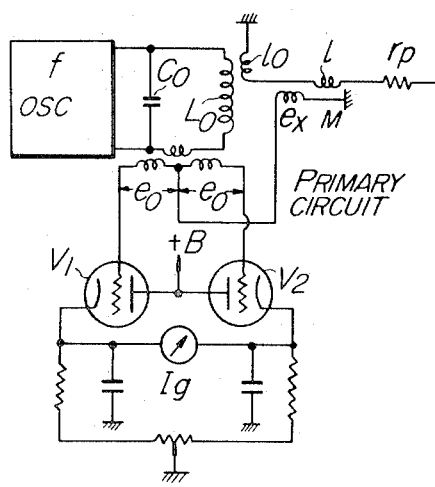
FIG. 1a
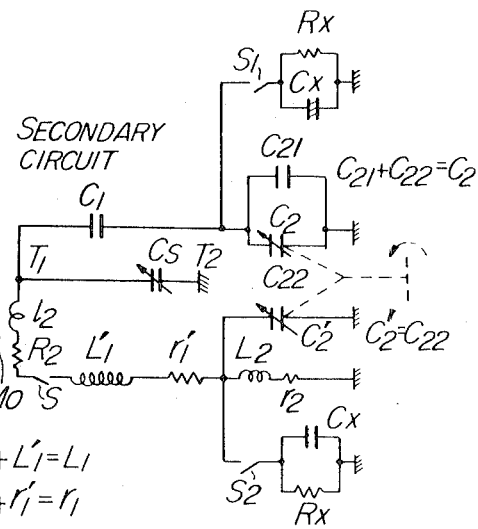
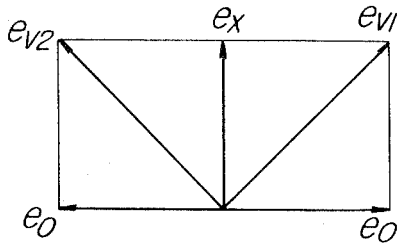
FIG. 2a
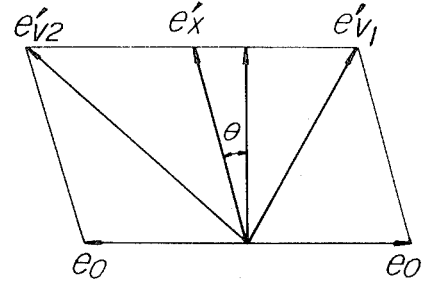
FIG. 2b
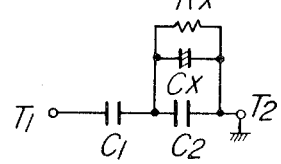
FIG. 1b
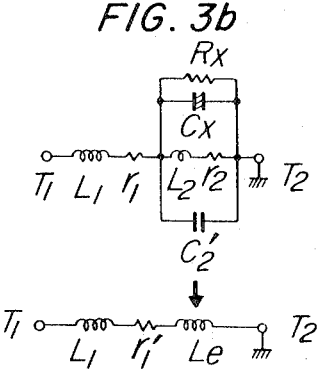
FIG. 3a
FIG. 3b
INVENTOR
BUNJIRO ICHIJO
BY Hall, Pollock & Vande Sande
ATTORNEY

METER FOR MEASURING CAPACITANCES OF EXTREMELY HIGH LOSS DIELECTRIC MATERIALS

A problem always encountered in measuring the dielectric characteristics of extremely high loss materials such as wood or clay containing a quantity of water, gum containing a large amount of carbon, various electrolytic solution, etc., is the accurate measurement of the specific dielectric constant of such a material, namely the measurement of the electrostatic capacity of a material of a given size.

Where an electrostatic capacity is to be measured by a tuning method at a high frequency, if an equivalent parallel resistance of the test sample assumes a value of 100 to 1,000$\Omega$, the $\Phi$ value of the tuning circuit goes below unity thereby making the measurement of the capacitance very difficult.

An object of the present invention is to enable an accurate measurement of an electrostatic capacity of such high loss materials.

The present invention brings about a remarkable effect in that the electrostatic capacity of a high loss material can be accurately measured independently of the value of the resistance component of the material itself.

The above and other objects, features and advantages of the present invention will be apparent from the following detailed description of a preferred embodiment thereof taken in conjunction with the accompanying drawings, in which:

FIG. 1$a$ is a circuit diagram of an example of a capacitance measuring apparatus for high loss dielectric materials suitable for working the present invention;

FIG. 1$b$ shows an equivalent circuit of a secondary circuit to which test samples are to be connected;

FIG. 2$a$ is a voltage vector diagram in a primary circuit when test samples are not connected in the secondary circuit;

FIG. 2$b$ is a voltage vector diagram in the primary circuit when test samples are connected in the secondary circuit;

FIG. 3$a$ shows a capacitance branch circuit in the secondary circuit; and

FIG. 3$b$ shows an inductance branch circuit in the secondary circuit.

Referring to FIG. 1$a$, OSC designates a high-frequency oscillator of a stable frequency, and $L_o$ and $C_o$ comprise an inductance and a capacitance forming an output tank circuit.

A circuit which is indicated by a series of components $\iota_o$-$\iota$-$C_v$-$L_p$ and which is electromagnetically coupled to $L_o$ through the small inductance $\iota_o$ forms a tuning circuit in the primary side of the measuring instrument. Two voltages $e_o$ and $e_x$ are induced in the detection circuit $V_1 1$, $V_2$, etc. through the respective electromagnetic couplings to a coil in the tank circuit $L_o$, $C_o$ and to the inductance $\iota$ in the primary circuit, and have a phase difference of 90° therebetween. Hence, if the illustrated secondary circuit of the instrument is open-circuited or is tuned to the primary source frequency, a vector diagram of the detection circuit in the primary side is such as shown in FIG. 2$a$, and the value of the output current $I_g$ of the illustrated phase discriminating circuit is zero. While the secondary circuit is tuned to the source frequency $f$, if the coefficient of mutual induction between $L_p$ and $\iota_2$ is denoted by $M_o$ and an equivalent series resistance of the secondary circuit is donated by $r_e$ as shown in FIG. 1$b$, in the primary side, the resistance value thereof is increased by the amount of $\omega^2 M_o^{2a} \%r_e$, whereas, the reactance value thereof is not changed at all. When the secondary side is tuned, only the resistance value is changed and the reactance value remains unchanged in the primary side, hence the value of the induced voltage $e_x$ is changed, but the phase difference between the two induced voltages $e_x$ and $e_o$ is maintained at 90° as before, so the output current $I_g$ remains zero.

If we now suppose that the capacitance value of the secondary side is varied by a small amount of $\pm\Delta C$ from its value when tuned, the variation $\Delta L$ in $L_p$ in the primary side will be:

$$\Delta L = \mp(\omega^2 M o^2 \Delta C / \omega^2 C e^2 r e^2) \quad (1)$$

This variation $\Delta L$ causes the phase of $e_x$ to shift by an angle of $\theta$ as shown in FIG. 2$b$ so that a difference is produced between the input voltages to $V_1$ and $V_2$ in the phase discriminating circuit thereby generating an output.

As a measurement procedure, at first, only the primary side of the instrument is adjusted to tune it to the frequency $f$ thereby making the output current $I_g$ zero. Then the switch S in the secondary circuit is closed and the completed secondary circuit is tuned to $f$ through the adjustment of a variable capacitor $C_s$ thereby restoring the output current $I_g$ to zero. Following that, if the two switches $S_1$ and $S_2$ are simultaneously closed, to connect into the secondary circuit two identical high loss samples, each of which is represented by $R_x$ and $C_x$, in parallel with $C_2$ ($C_2 \gg C_1$) and $L_2$ ($L_2 \ll L_1$) respectively, an output current $I_g$ will be produced in the phase discriminating circuit $V_1$, $V_2$ etc. At this point if the respective ganged condensers $C_2$ and $C'_2$ are simultaneously reduced by a decrement which equals $C_x$, the output current $I_g$ is again restored to zero. As a result, the value of $C_x$ can be obtained from the decrements of $C_2$ and $C'_2$ independently of the value of $R_x$.

The arrangement wherein the capacitance is divided into $C_1$ and $C_2$ ($C_2 = C_{22} + C_{21}$) and wherein the inductance is divided into $L_1$ and $L_2$, in the secondary circuit is intended to prevent the $\Phi$ value of the secondary circuit from being lowered on account of the low resistance value of $R_x$. Furthermore, the measurement of $C_x$ by a null method on the basis of a substitution method wherein test samples are simultaneously connected with $L_2$ and $C_2$ is due to the following principles, which form the foundation of the present application of this measuring apparatus.

Now, in FIG. 3$a$, let us denote a capacitance increment seen from terminals $T_1$ and $T_2$ with $\Delta C_p$, the capacitance increment caused by $R_x$ and $C_x$ which are connected in parallel with $C_2$. Then $\Delta C_p$ is expressed by:

$$\Delta C_p = C_1 \times \frac{C_1}{C_1+C_2} \times \frac{1}{1+\omega^2(C_2+C_x)(C_1+C_2+C_x)R_x^2}$$
$$+ C_x \times \frac{C_1}{C_1+C_2} \times \frac{\omega^2 C_1 (C_2+C_x) R_x^2}{1+\omega^2(C_2+C_x)(C_1+C_2+C_x)R_x^2} \quad (2)$$

In equation (2), the first term denotes the apparent capacitance increment due to the addition of the resistance $R_x$, and the second term denotes the apparent capacitance increment due to the addition of the capacitance $C_x$. If $C_x$ is taken to be zero, the second term vanishes thereby leaving the apparent capacitance increment only due to $R_x$. Hence, if the apparent capacitance increment of the first term only due to $R_x$ should be completely canceled out, the value of $C_x$ can be measured from a variation in $C_2$ independently of the value of $R_x$, and a test sample connected in parallel with $L_2$ does serve the purpose.

In FIG. 3$b$, if the test sample were not connected therewith, an equivalent inductance $L_e$ of a portion of the circuit which has a parallel connection is given by $L_e = (L_2/1 - \omega^2 L_2 C'_2)$. The equivalent inductance $L'_e$ when the sample denoted by symbols $R_x$ and $C_x$ has been connected therewith, is given by $$L'e = \frac{L_2 R_x^2 \{1 - \omega^2 L_2 (C'_2 + C_x)\}}{R_x^2 \{1 - \omega^2 L_2 (C'_2 + C_x)\}^2 + \omega^2 L_2^2}$$

Therefore, if $\Delta L_e$ denotes a small variation in the equivalent inductance due to the test sample connected therewith, $\Delta L_e$ is expressed as:

$$\Delta L_e = L'_e - L_e$$

If the expressions of $L'_e$ and $L_e$ which have already been obtained above are substituted in the above expression, $\Delta L_e$ is given by:

$$\times \frac{\omega^2 L_2^3}{(1-\omega^2 L_2 C'_2)[R_x^2\{1-\omega^2 L_2(C'_2+C_x)\}^2 + \omega^2 L_2^2]}$$
$$+ L_2 \times \frac{\omega^2 L_2 R_x^2 \{1-\omega^2 L_2 (C_2+C_x)\} C_x}{(1-\omega^2 L_2 C'_2)[R_x^2\{1-\omega^2 L_2(C'_2+C_x)\}^2 + \omega^2 L_2^2]} \quad (3)$$

In the right side of the above equation (3), the first term denotes the induction decrement due to the added $R_x$, and the second term denotes the inductance increment due to the added $C_x$.

In case that $C_x$ is to be measured by a substitution method, the variable condenser is reduced to the amount of the increased capacitance, and $C_x$ can be measured by the amount of the reduced capacitance, while in this case, the whole capacitance of the secondary circuit is maintained the same as when $C_x$ is not yet connected.

In case that the test sample is connected in parallel with $L_2$, to reduce $C'_2$ to the amount of $C_x$ is, as a result, identical to making $C_X$ zero. Hence, in the right side of the equation (3), the second term vanishes and only the inductance decrement due to the added resistance $R_x$ remains. If this inductance decrement is denoted with $\Delta L_{er}$, it is given by the following expressions:

$$\Delta L_{er} = -L_2 \times \frac{\omega^2 L_2^2}{(1-\omega^2 L_2 C'_2)[R_x^2(1-\omega^2 L_2 C'_2)^2 + \omega^2 L_2^2]}$$
$$= -\frac{L_e}{1+\frac{R_x^2(1-\omega^2 L_2 C'_2)^2}{\omega^2 L_2^2}} = -\frac{L_e}{1+\frac{R_x^2}{\omega^2 L_e^2}}$$

Similarly, in case that the test sample is connected in parallel with $C_2$, if $C_2$ is reduced to the amount of $C_x$, referring to the right side of the equation (2), the second term vanishes and only the apparent capacitance increment due to the added resistance $R_x$, which corresponds to the first term, remains. Because the whole capacitance of the secondary circuit is not varied after the substitution has been made, if this capacitance increment is denoted by $\Delta C_{pr}$, it is derived from the equation (2) and given by the following equation:

$$\Delta C_{pr} = C_1 \times \frac{C_1}{C_1+C_2} \times \frac{1}{1+\omega^2 C_2(C_1+C_2)R_x^2} \quad (5)$$

Now, if the effects of $\Delta L_{er}$ in the equation (4) and $\Delta C_{pr}$ in the equation (5) should completely cancel each other out, the influence of the resistance $R_x$ on the capacitance measurement can be eliminated.

In order to satisfy the above-mentioned condition, the following relation should hold:

$$\frac{\Delta L_{er}}{L_1+L_e} = \frac{\Delta C_{pr}}{C_s+C_o} \quad (6)$$

where $$C_o = \frac{C_1 C_2}{C_1+C_2}$$

$$L_e = \frac{L_2}{1-\omega^2 L_2 C'_2}$$

Substituting the Equations 4 and 5 for $\Delta L_{er}$ and $\Delta C_{pr}$ in the Equation 6, we obtain $$\frac{L_e}{L_1+L_e} \times \frac{1}{1+\frac{R_x^2}{\omega^2 L_e^2}} = \frac{C_1^2}{C_s+C_o} \times \frac{1}{C_1+C_2} \times \frac{1}{1+\omega^2 C_2(C_1+C_2)R_x^2}$$

The above equation may be transformed into the following equation:

$$\frac{L_e}{L_1+L_e} \times \frac{1}{1+\frac{R_x^2}{\omega^2 L_e^2}} = \frac{C_1}{C_2\left(1+\frac{C_s}{C_o}\right)}$$
$$\times \frac{1}{1+\omega^2 C_2(C_1+C_2)R_x^2} \quad (7)$$

As a condition to make the equation (7) hold, the following relationship should exist:

$$\frac{L_e}{L_1+L_e} = \frac{C_1}{C_2\left(1+\frac{C_s}{C_o}\right)} \quad (8)$$

$$\omega^4 L_e^2 C_2(C_1+C_2) = 1 \quad (9)$$

The Equation 9 may be simplified by an approximation as follows:

$$\omega^4 L_e C_2\left(1+\frac{1}{2}\cdot\frac{C_1}{C_2}\right) = 1 \text{ provided } C_2 \gg C_1 \quad (9)'$$

On the other hand, the tuning condition of the secondary circuit is given by:

$$\omega^2(L_1+L_e)(C_s+C_o) = 1 \quad (10)$$

From the Equations 8, 9' and 10

$$C_s = \frac{3}{4} \times \frac{1}{1+\frac{C_2}{C_1}} \times C_1 \quad (11)$$

Then, from the Equations 8 and 11

$$\frac{L_e}{L_1+L_e} = \frac{C_1}{\frac{3}{4}C_1+C_2} \quad (12)$$

If the secondary circuit of the capacitance measuring apparatus is constructed by adopting the circuit constants so as to satisfy the conditions of the equations (9) and (12), the capacitance $C_x$ of a test sample can be accurately measured by a null method on the basis of a substitution method independently of the value of the resistance $R_x$.

Experimental results have proved that the apparatus of the present invention can measure the capacitance $C_x$ independently of the value of the resistance $R_x$ to the extent of 50Ω at a frequency of 2 MHz.

What is claimed is:

1. A capacitance meter for measuring capacitances of extremely high loss dielectric materials comprising:
   a primary circuit including a high-frequency oscillator, of stable angular frequency ω, having a tank circuit; a phase-discriminating circuit coupled to said tank circuit, and a first series resonance circuit coupled to said tank circuit and to said phase-discriminating circuit; and
   a secondary circuit comprising a second series resonance circuit electromagnetically coupled to the first series resonance circuit of said primary circuit, said second circuit including a pair of inductances $L_1$ and $l_2$ and a pair of capacitances $C_1$ and $C_2$, a calibrated gang variable condenser having capacitances $C_{22}$ and $C'_2$ connected in parallel respectively with a capacitor of capacitance $C_{21}$ and with said inductance $L_2$, and two identical test samples, whose capacitances are to be measured, connected respectively in parallel with said capacitance $C_2$ and with said inductance $L_2$, the values of said elements satisfying the conditions $$\omega^4 \cdot Le^2 \cdot C_2 \cdot (C_1+C_2) = 1 \text{ and } \frac{Le}{L_1+Le} = \frac{C_1}{3/4 \cdot C_1+C_2}$$

where $Le = \frac{L_2}{1-\omega^2 L_2 C'_2}$, $C_2 = C_{21}+C_{22}$, $C_{2'} = C_{22}$, $C_2 = (10 \text{ to } 20.) C_1$ and $L_1 = (10 \text{ to } 20) \cdot L_2$.

* * * * *